United States Patent
Davies

(10) Patent No.: US 6,262,741 B1
(45) Date of Patent: Jul. 17, 2001

(54) TILING OF OBJECT-BASED GEOGRAPHIC INFORMATION SYSTEM (GIS)

(75) Inventor: Frederick Bryan Davies, McLean, VA (US)

(73) Assignee: PRC Public Sector, Inc., McLean, VA (US)

(*) Notice: Subject to any disclaimer, the term of this patent is extended or adjusted under 35 U.S.C. 154(b) by 0 days.

(21) Appl. No.: 09/042,850

(22) Filed: Mar. 17, 1998

(51) Int. Cl.$^7$ .................................................. G06T 11/40

(52) U.S. Cl. ........................... 345/425; 345/428; 345/429

(58) Field of Search .................................... 345/425, 423, 345/428, 429, 418, 419

(56) References Cited

U.S. PATENT DOCUMENTS

| | | | |
|---|---|---|---|
| 4,899,293 | * 2/1990 | Dawson et al. ........................ | 364/521 |
| 5,337,404 | 8/1994 | Baudelaire et al. . | |
| 5,357,599 | 10/1994 | Luken . | |
| 5,367,615 | * 11/1994 | Economy et al. ..................... | 345/429 |
| 5,381,338 | 1/1995 | Wysocki et al. ...................... | 701/207 |
| 5,412,573 | 5/1995 | Barnea et al. ........................ | 701/211 |
| 5,426,780 | 6/1995 | Gerull et al. ............................. | 707/3 |
| 5,455,897 | 10/1995 | Nicholl et al. . | |
| 5,467,441 | 11/1995 | Stone et al. ........................... | 345/433 |
| 5,475,802 | * 12/1995 | Wescott et al. ....................... | 345/429 |
| 5,488,684 | 1/1996 | Gharachorloo et al. . | |
| 5,499,371 | 3/1996 | Henninger et al. ................... | 395/702 |
| 5,519,392 | 5/1996 | Oder et al. ............................ | 340/995 |
| 5,528,518 | 6/1996 | Bradshaw et al. .................... | 702/150 |
| 5,604,892 | 2/1997 | Nuttall et al. . | |
| 5,631,970 | 5/1997 | Hsu . | |
| 5,870,686 | 2/1999 | Monson . | |
| 5,949,425 | * 9/1999 | Willis .................................... | 345/428 |
| 5,986,663 | * 11/1999 | Wilde ................................... | 345/428 |

OTHER PUBLICATIONS

"A Generic Model for Planar Geographical Objects", by Michael F. Worboys, Int. J. Geographical Information Systems, 1992, vol. 6, No. 5, pp. 353–372.

"GIS and Object Oriented Technology", Considerations for Implementation of a GIS System Using Objects, Tom Myers, Nov. 26, 1996, pp. 1–5.

"GEOGR 686 Seminar in Object–Oriented GIS", S. Khoshafian et al, Autumn 1996, pp. 1–4.

"A Spatial Data Model Design for Feature–Based Geographical Information Systems", Agatha Tang, et al., Int. J. Geographical Information Systems, 1996, vol. 10, No. 5, pp. 643–659.

"Development of a Geomorphological Spatial Model Using Object–Oriented Design", Jonathan Raper et al., Int. J. Geographical Information Systems, 1995, vol. 9, No. 4, 359–383.

"Object–Oriented Approaches to Geo–Referenced Information", Michael F. Worboys, Int. J. Geographical Information Systems, 1994, vol. 8, No. 4, pp. 385–399.

(List continued on next page.)

*Primary Examiner*—Cliff N. Vo
(74) *Attorney, Agent, or Firm*—Lowe Hauptman Gilman & Berner, LLP

(57) ABSTRACT

Disclosed is a method for displaying a topology having topological features on a display. The method includes dividing the topological region into tessellations. An object-based database is accessed which comprises geometrical objects representing the topological features with each geometrical object associated with a particular tessellation. The geometrical objects are one of a polygon object, a polyline object and a point object representing the topological features. A tessellation is selected to be displayed. The geometrical objects are fetched which are associated with the tessellations to be displayed. The fetched geometrical objects are drawn on the display.

34 Claims, 21 Drawing Sheets

OTHER PUBLICATIONS

"Object–Oriented Knowledge–Based Symbol Selection for Visualizing Statistical Information", Feibing Benjamin Zhan et al., Int. J. Geographical Information Systems, 1995, vol. 9, No. 3, pp. 293–315.

"Getting Started with Geographic Information Systems", Keith C. Clarke, Prentice Hall Series in Geographical Information Science, 1997 by Prentice–Hall, Inc., pp. 1–353.

* cited by examiner

| File of Arcs by Polygon |
|---|
| A: 1, 2, 3, 4, Area, Attributes |

| Arcs File | |
|---|---|
| A | 1, 2, 3, 4 |
| B | 4, 5 |
| C | 5, 6 |
| D | 6, 1 |

| Vertices File | |
|---|---|
| 1 | $x_1 y_1$ |
| 2 | $x_2 y_2$ |
| 3 | $x_3 y_3$ |
| 4 | $x_4 y_4$ |
| 5 | $x_5 y_5$ |
| 6 | $x_6 y_6$ |

| Topological Arcs File | | | | | | | | |
|---|---|---|---|---|---|---|---|---|
| Arc | From | To | PL | PR | $n_1x$ | nxy | $n_2x$ | $n_2x$ |
| 4 | n1 | n2 | A | B | $x_1$ | $y_1$ | $x_2$ | $y_2$ |
| 5 | n2 | n3 | A | C | $x_2$ | $y_2$ | $x_3$ | $y_3$ |

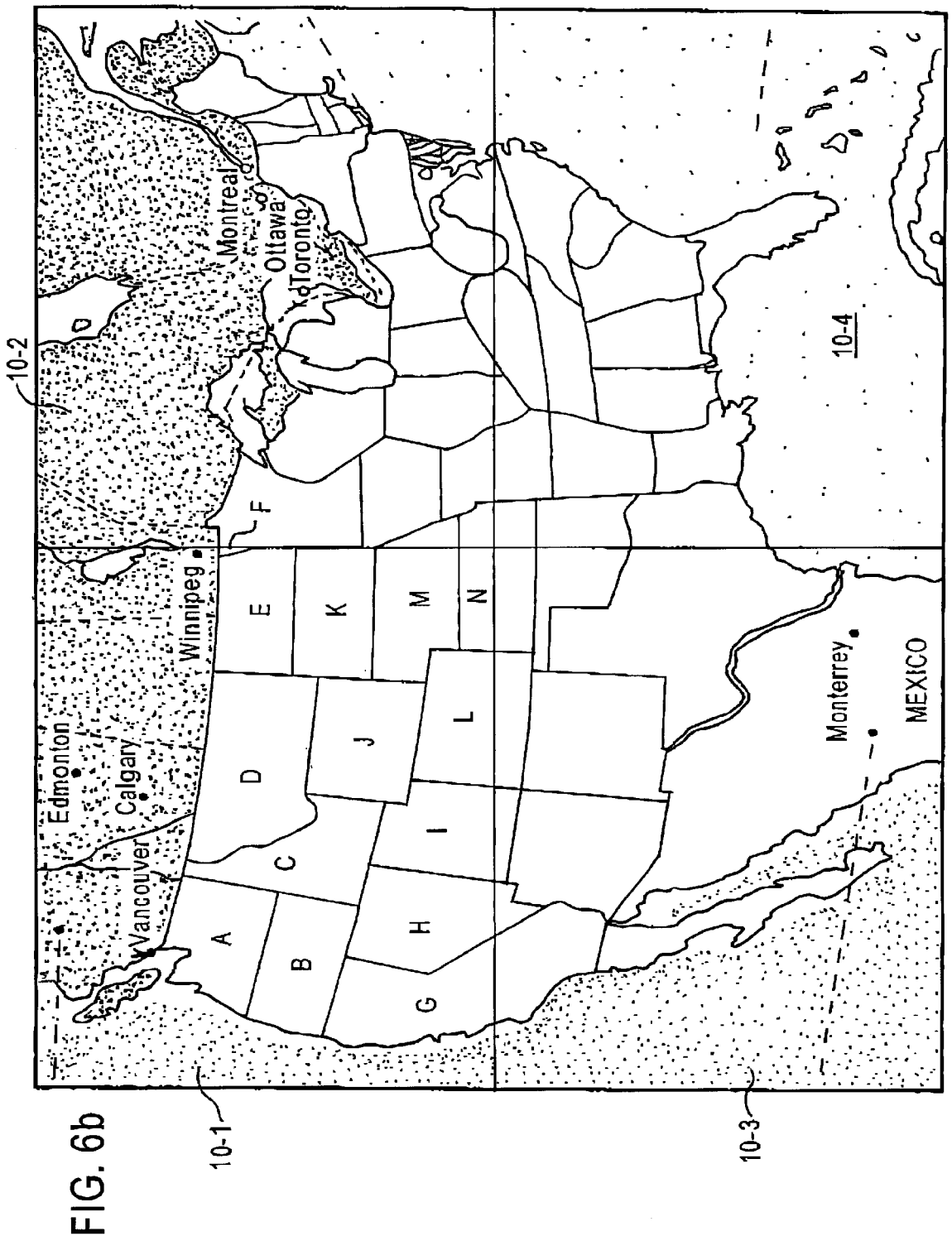

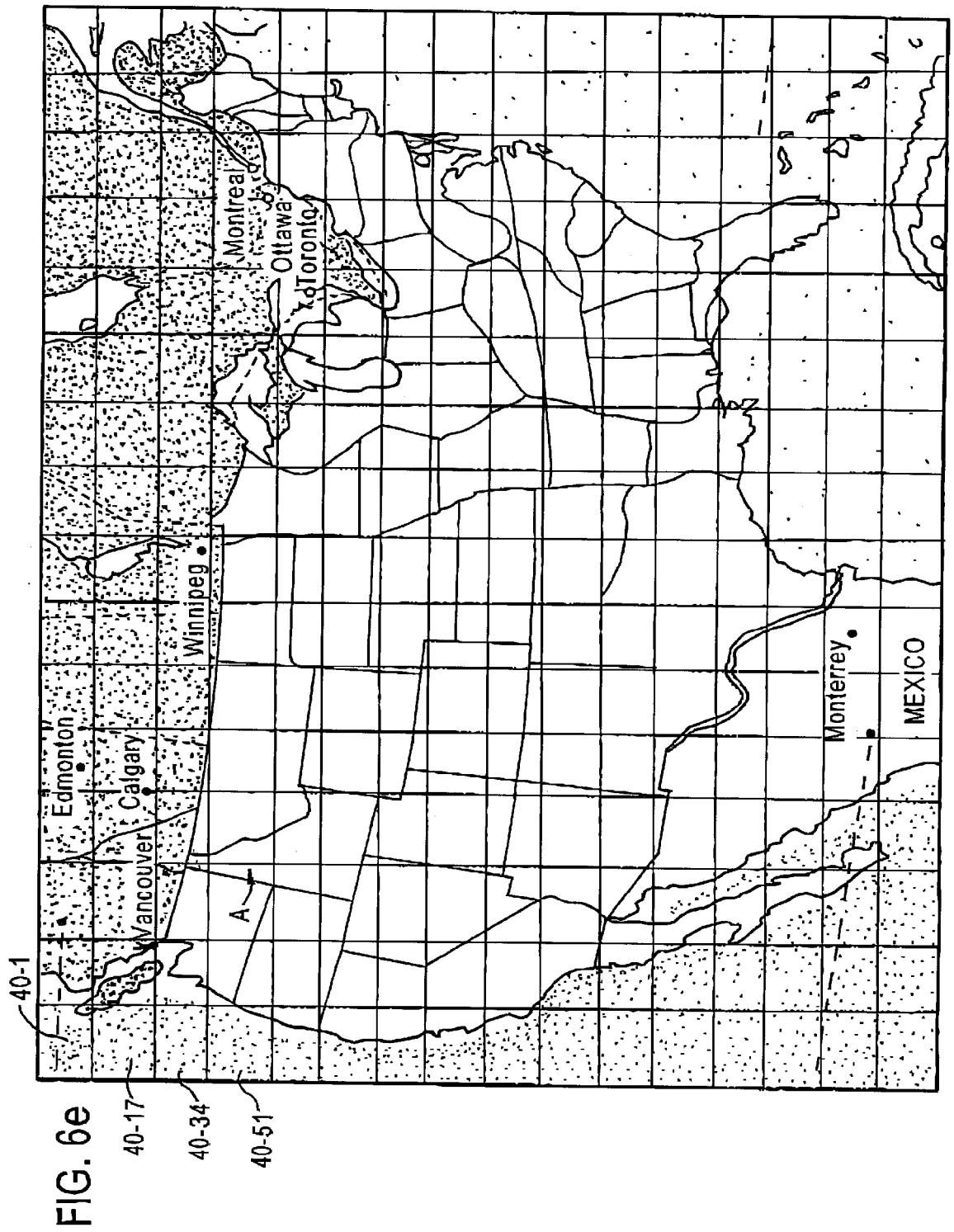

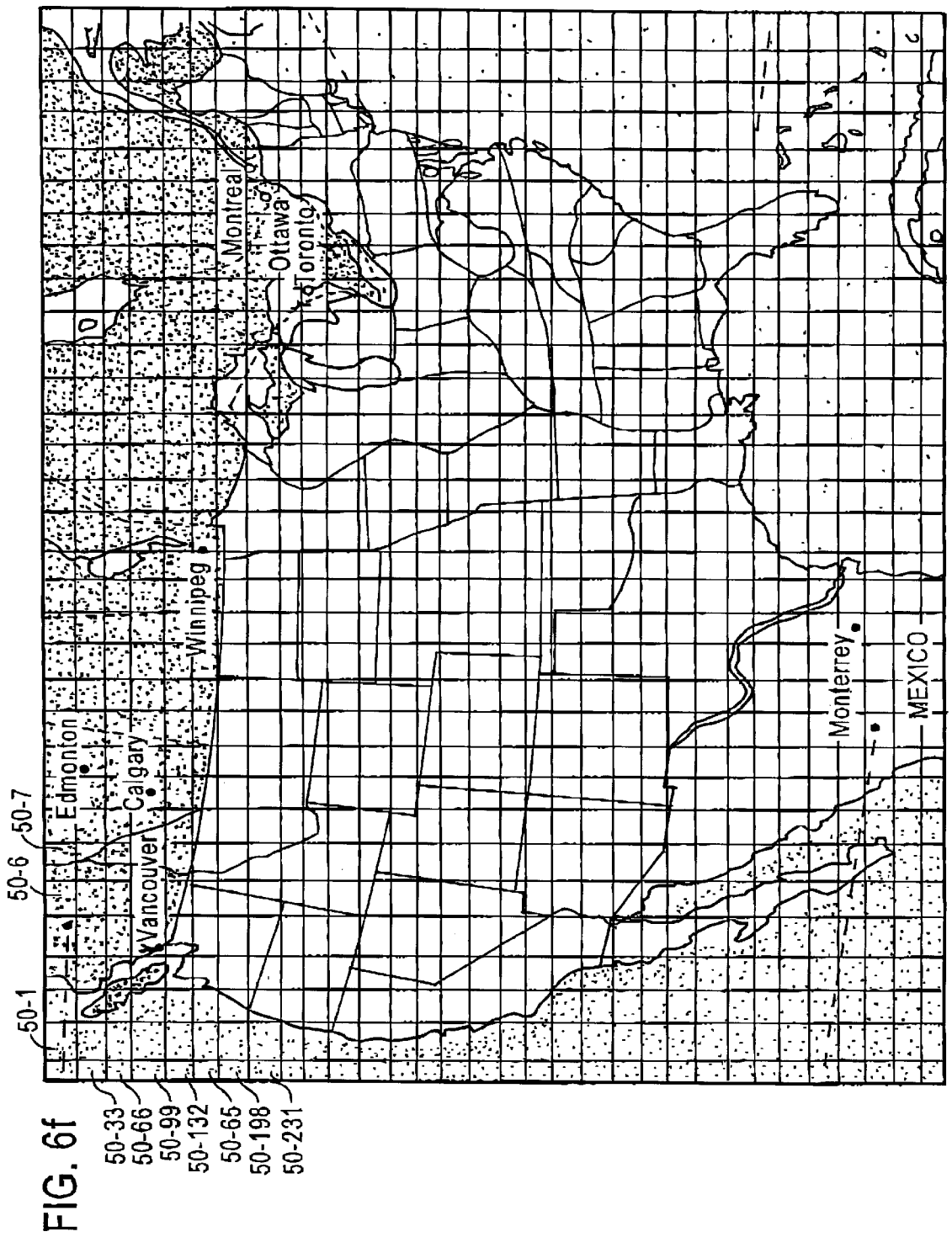

FIG. 7a

| OBJECT CLASS | TILE | BITMAP | VISIBILITY LEVEL | COLOR |
|---|---|---|---|---|
| Raster | 00-1 | | | |

| OBJECT CLASS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| Polygon | 00-1 | A | United States | | | | |

| OBJECT CLASS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| Polyline | | | | | | | |

| OBJECT CLASS | TILE | IDENTIFIER | FEATURE IDENTIFIER | VISIBILITY LEVEL | X-Y | COLOR | LINE WEIGHT |
|---|---|---|---|---|---|---|---|
| Point | | | | | | | |

FIG. 7b-1

| OBJECT CLASS | TILE | BITMAP | VISIBILITY LEVEL | COLOR |
|---|---|---|---|---|
| Raster | 10-1 | | | |

| OBJECT CLASS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| Polygon | 10-1 | A | Washington | | | | |
| | 10-1 | B | Oregon | | | | |
| | 10-1 | C | Idaho | | | | |
| | 10-1 | D | Montana | | | | |
| | 10-1 | E | North Dakota | | | | |
| | 10-1 | F | Minnesota | | | | |
| | 10-1 | G | California | | | | |
| | 10-1 | H | Nevada | | | | |
| | 10-1 | I | Utah | | | | |
| | 10-1 | J | Wyoming | | | | |
| | 10-1 | K | South Dakota | | | | |
| | 10-1 | L | Colorado | | | | |

FIG. 7b-2

| OBJECT CLASS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| | 10-1 | M | Nebraska | | | | |
| | 10-1 | N | Kansas | | | | |

| OBJECT CLASS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| Polyline | | | | | | | |

| OBJECT CLASS | TILE | IDENTIFIER | FEATURE IDENTIFIER | VISIBILITY LEVEL | X-Y | COLOR | LINE WEIGHT |
|---|---|---|---|---|---|---|---|
| Point | 10-1 | | | | | | |

FIG. 7c

| OBJECT CLASS | TILE | BITMAP | VISIBILITY LEVEL | COLOR |
|---|---|---|---|---|
| Raster | 20-1 | | | |

| OBJECT CLASS | TILE | IDENTIFIER | FEATURE IDENTIFIER | VISIBILITY LEVEL | ORDERES LIST OF COORDINATES | COLOR | LINE WEIGHT |
|---|---|---|---|---|---|---|---|
| Polygon | | | | | | | |

| OBJECT CALSS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| Polyline | 20-1 | A | Interstate 90 | | | | |
| | 20-1 | B | Route 2 | | | | |

| OBJECT CLASS | TILE | IDENTIFIER | FEATURE IDENTIFIER | VISIBILITY LEVEL | X-Y | COLOR | LINE WEIGHT |
|---|---|---|---|---|---|---|---|
| Point | | | | | | | |

FIG. 7d

| OBJECT CLASS | TILE | IDENTIFIER | BITMAP | VISIBILITY LEVEL | COLOR |
|---|---|---|---|---|---|
| Raster | 30-10 | | | | |

| OBJECT CLASS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| Polygon | 30-10 | X | County X | | | | |

| OBJECT CLASS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| Polyline | | | | | | | |

| OBJECT CLASS | TILE | IDENTIFIER | FEATURE IDENTIFIER | VISIBILITY LEVEL | X-Y | COLOR | LINE WEIGHT |
|---|---|---|---|---|---|---|---|
| Point | | | | | | | |

FIG. 7e

| OBJECT CLASS | TILE | BITMAP | VISIBILITY LEVEL | COLOR |
|---|---|---|---|---|
| Raster | 40-53 | | | |

| OBJECT CLASS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| Polygon | | | | | | | |

| OBJECT CLASS | TILE | IDENTIFIER | FEATURE IDENTIFIER | VISIBILITY LEVEL | ORDERED LIST OF COORDINATES | COLOR | LINE WEIGHT |
|---|---|---|---|---|---|---|---|
| Polyline | | | | | | | |

| OBJECT CLASS | TILE | IDENTIFIER | FEATURE IDENTIFIER | VISIBILITY LEVEL | X-Y | COLOR | LINE WEIGHT |
|---|---|---|---|---|---|---|---|
| Point | 40-53 | A | Lewiston, Idaho | | | | |

TILING OF OBJECT-BASED GEOGRAPHIC INFORMATION SYSTEM (GIS)

FIELD OF THE INVENTION

The present invention relates generally to object-oriented, geographic information systems (GIS), and more particularly, to an object-based geographical information system capable of displaying a topological region in real time, a geographical information system using a virtual blackboard for scrolling in real time, and a method of building an object-based database of topological features.

BACKGROUND OF THE INVENTION

Geographic information systems (GIS) store, retrieve and display topological information. The topological information is obtained from a topology which is a topographic study of a geographic region. The topographic study may be a map having features of the geographic region including rivers, lakes, etc. and canals, bridges, roads, etc.

In the prior art, a topology can be the numerical description of the relationships between geographic features, as encoded by adjacency, linkage, inclusion, or proximity. Thus a point can be inside a region, an arc can connect to other arcs, and a region can have neighboring or adjacent regions. Many GIS systems are constructed using object oriented programming systems and database managers. These object oriented programs and database managers are topologically based and rely on topological data structures.

A typical prior art object-oriented topology-based data structure for a GIS system is depicted in FIG. 1. In these prior art systems, topological information is classified by feature objects using geometrical primitives to reconstruct a topological feature.

In this type of data structure, depicted in FIG. 1, the regions, polygons, arcs and vertices are known as geometrical primitives. Geometrical primitives are classes used to reconstruct a region or object. This topological based system requires that links be maintained between each of the primitives to reconstruct a region. These systems are referred to as topological based systems having topologically based data structures because topological information is classified by topological feature objects using geometrical primitives to reconstruct each topological feature. For example, a topological feature (region) could be the United States, and there would be a polygon file linked to the United States region file. The polygon file defining the boundary of the United States is linked to arc files. The arc files are then linked to vertice files. Each primitive is linked to another primitive.

In the language of object oriented programming, in this example, the United States region is an object and the polygons, arcs and vertices are classes. The United States region inherits or receives attributes from ancestors (polygons, arcs and vertices). The United States region is also known as an instance. An instance is used to denote the creation of an object from one or more classes.

In the prior art, in another example, an individual state can also be a region and an object. For example, the state of Utah can be an instance and would inherit attributes from ancestors (polygons, arcs and vertices).

A more complex but still relatively simple topological data structure can be explained with reference to FIG. 2a. FIG. 2a is a prior art arc/node diagram of a polygon depicting the outline of the state of Utah. The boundary of Utah is defined by four arcs 1, 2, 3, 4 and nodes 1, 2, 3, 4, 5, 6. Each arc has a set of points ordered from node to node in a sequence. In FIG. 2b, a polygon file contains an entry for the area of the polygon, an entry for the attributes of the polygon and an entry listing the arcs defining the polygon. In FIG. 2c, an arcs file lists the vertices for each arc. For example, vertices 1, 2, 3, 4 are the vertices for arc 1. In FIG. 2d, a vertices file lists the coordinates for each of the points. The vertices are then connected to each other in sequence. Curves would be defined by many straight short arcs.

A more powerful topological data structure uses the arc as the basis for data storage. This can be explained with reference to FIGS. 3a and 3b in which the arcs file includes information not only about the particular arc but also includes information about the neighbors of each arc. FIG. 3a depicts a skeleton of two adjacent polygons A and B. For simplicity, only a topological arc file is depicted for arc 1 in FIG. 3b. The arc file for arc 1 includes the x and y coordinates for the end points or nodes (n1, n2) of the arc as described above. The arc file also includes information for the polygon number which lays to the left and right of the arc (polygon left (PL) is A and polygon right (PL) is B). Information can also be included on the arc number of the other arcs connected to the end nodes. A polygon can be reconstructed by extracting all of the arcs that a specific polygon has as a neighbor.

In all of the prior art examples discussed above, to display a topological region, the region has to be assembled from the most primitive components stored in the database. In the system, the whole process of assembling and computing the topology of the region and the object from its primitives means that the prior art GIS systems are very slow.

Mission critical applications require the display of topological information in real time. The requirement for real time is that in certain applications a driver or pilot needs to make decisions and perform course corrections within a certain amount of time or it would be too late and the vehicle, airplane or ship would crash. In the GIS environment, real time means applications where there is a need to be able to draw a map or topological region in five seconds or less. These prior art GIS systems are not capable of displaying in real time and, thus, in mission critical applications, these topological-based data structures are not capable of providing real time information. These systems can take several minutes or even longer to display a topological region.

Mission critical environments include take off and landings of airplanes at high speeds or used in tight navigational sea environments such as entering or exiting harbors where water conditions and obstructions in the water change daily. In the take off and landings of airplanes, a plane might be approaching Denver International airport at about 300 miles per hour (about 500 feet per second) with mountains in the distance. Should the airplane be off course and the GIS system crashes, if the GIS system took several minutes to recover, this would be too long for the pilot to recover. In this situation, about five seconds is considered adequate. In the navigational environment, it takes can take a large ship a long time to change course and so this is also a mission critical application.

Another major disadvantage of topological data structures is that these are very expensive data structures to assemble because of all the relationships needed between each of the primitives such as adjacency, linkage, inclusion or proximity. The topological data structure is also expensive to maintain.

Thus, there is a need for a GIS system which can display topological regions in real time for use in environments such as airplane landings and in tight navigational environments. There is also a need to scroll from a topological region currently being displayed to topological regions not being displayed. Another need is to zoom or enlarge a displayed topological region in real time. A need also exists for a data structure which is less expensive to build and maintain.

SUMMARY OF THE INVENTION

It is, therefore, an object of the present invention to substantially overcome the above-identified problems and substantially fulfill the above-identified needs.

It is another object of the present invention to provide a GIS system which can display a topological region in real time.

It is a further object of the present invention to provide a GIS system having a data structure which is inexpensive to build and maintain.

It is yet another object of the present invention to provide a GIS system using a virtual blackboard for storing regions of maps not currently being displayed so that these regions can be displayed on a display screen almost instantaneously.

It is yet another object of the present invention to provide a GIS system capable of zooming or enlarging a displayed topological region in real time.

It is yet another object of the present invention to provide a GIS system for scrolling in real time from a region of map currently being displayed to a different region not being displayed.

In accordance with the present invention, topological information is classified as geometrical objects and use feature identifiers to reconstruct each topological feature. The present invention starts from the geometry (object) of the topological features containing an identifier of the feature as an attribute of the object. These complete geometrical objects need not inherit attributes from other objects. The objects are classified as either a polygon object, polyline object, point object or raster object and stored in a respective object-based database. Using this data structure a topological region can be displayed in real time by accessing this object-based data structure and loading the data structure associated with the topological region into a buffer. The geometrical objects associated with the topological region are then fetched from the buffer and loaded into a virtual blackboard. The fetched geometrical objects are then drawn on a display in real time.

These and other objects of the present invention are achieved by a method for displaying a topology having topological features on a display. The method includes dividing the topological region into tessellations. An object-based database is accessed which comprises geometrical objects representing the topological features with each geometrical object associated with a particular tessellation. The geometrical objects are one of a polygon object, a polyline object and a point object representing the topological features. A tessellation is selected to be displayed. The geometrical objects are fetched which are associated with the tessellations to be displayed. The fetched geometrical objects are drawn on the display.

These and other objects of the present invention are achieved by a method for displaying a topology having topological features on a display. The method includes dividing the topological region into tiles. The tiles are layered on different layers with a top layer having a single tile and lower layers of tiles have succeedingly greater numbers of tiles. An object-based database is accessed comprising geometrical objects representing the topological features with each geometrical object associated with a particular tile. The geometrical objects are associated with one of a polygon object, an polyline object and a point object representing the topological features. Four tiles are selected. The geometrical objects associated with the four tiles are fetched. The fetched geometrical objects of one tile are drawn on the display.

These and other objects of the present invention are achieved by a method of building an object-based database of a topology having topological features with the topological region being divided into tessellations on different layers. The topological features are identified as geometrical objects with the geometrical objects being one of a polygon object, a polyline object and a point object. The geometrical objects each have a feature identifier attribute and are associated with one or more tessellations on a layer. The polygon objects are stored in a polygon object database. The polyline objects are stored in a polyline object database. The point objects are stored in a point object database.

These and other objects of the present invention are achieved by providing an article including at least one sequence of machine executable instructions. A medium bears the executable instructions in machine readable form, wherein execution of the instructions by one or more processors causes the one or more processors to access an object-based database comprising geometrical objects representing topological features of a topological region. The topological region is divided into tessellations on different layers. The geometric features are associated with one or more tessellations on a layer with the geometrical objects being one of a polygon object, a polyline object and a point object. The geometrical objects are fetched which are associated with a plurality of tessellations one of which is to be displayed. The fetched geometrical objects associated with the one tessellation are drawn on a display.

These and other objects of the present invention are achieved by providing a computer-readable medium having a data structure stored thereon for access by a GIS system. The GIS system displays a topological region having topological features on a display. The topological region is divided into tessellations on different layers with the topological features being classified as geometrical objects having feature identifiers, the geometrical objects being one of a polygon object, a polyline object and a point object. The data structure comprises a polygon object database having polygon objects each associated with a topological region with each polygon object having at least a feature identifier attribute and an ordered list of coordinates attribute and being associated with one or more tessellations on a layer. A polyline object database has polyline objects each associated with a topological region with each polyline object having at least a feature identifier attribute and an ordered list or coordinates attribute and being associated with one or more tessellations on a layer. A point object database has point objects each associated with a topological region with each point object having at least a feature identifier attribute and an x-y coordinate attribute and being associated with one or more tessellations on a layer.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 3a depicts a skeleton of two adjacent polygons A and B;

FIG. 3b depicts a topological arc file for arc 1 in FIG. 3a;

FIG. 6b is an illustration of the geographic region of FIG. 1 with this Figure being at a next lower level (level 10), with the entire region being divided into four tiles (2×2);

FIG. 6e is an illustration of the geographic region of FIG. 1 with this Figure being at a next lower level (level 40), with the entire region being divided into two hundred and twenty four tiles (16×16);

FIG. 6f is an illustration of the geographic region of FIG. 1 with this Figure being at a next lower level (level 50), with the entire region being divided into one thousand and twenty four tiles (32×32);

FIG. 7a is a diagram of the database file for tile 00-1;
FIG. 7b is a diagram of the database file for tile 10-1;
FIG. 7c is a diagram of the database file for tile 20-1;
FIG. 7d is a diagram of the database file for tile 30-10;
FIG. 7e is a diagram of the database file for tile 40-53;

BEST MODE FOR CARRYING OUT THE INVENTION

A method and apparatus for mapping and displaying information from a Geographic Information System in real time according to the present invention are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present application is related to copending patent applications entitled "OBJECT-BASED GEOGRAPHICAL INFORMATION SYSTEM" and "PREDICTIVE DROP AND LOAD ALGORITHM FOR OBJECT-BASED GEOGRAPHICAL INFORMATION SYSTEM" both filed on even date herewith and assigned to the instant assignee and both of which are hereby incorporated by reference in their entirety into this specification.

Figure 4:
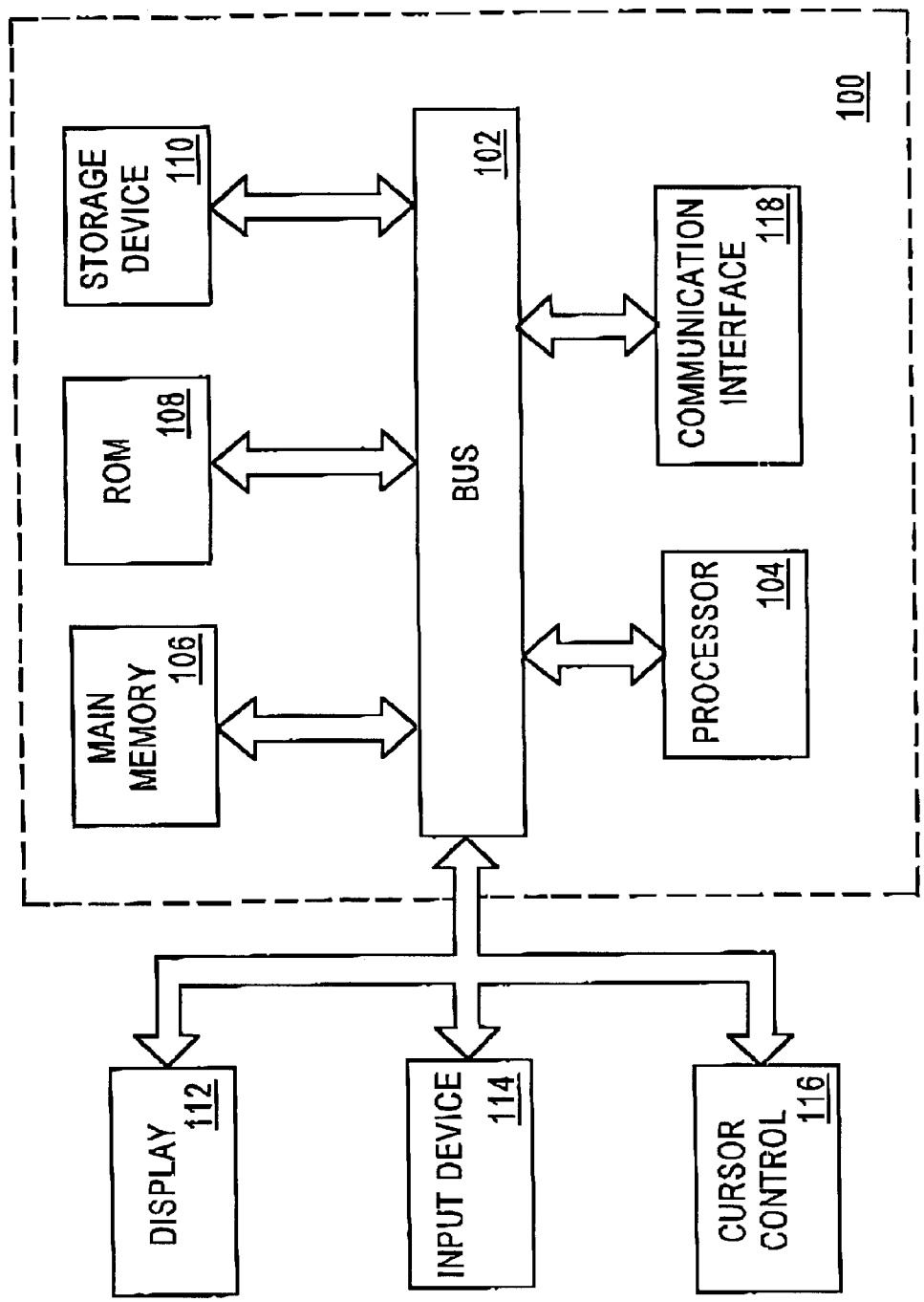
FIG. 4 is a high-level block diagram of an exemplary computer system with which the present invention can be implemented.

FIG. 4 is a block diagram illustrating an exemplary computer system 100 upon which an embodiment of the invention may be implemented. The present invention is usable with currently available personal computers, mini-mainframes and the like. The present invention is also envisioned as usable in the cockpit of an aircraft, on a ship and in moving land vehicles. It is believed that invention described herein can readily be adapted for specific hardware configurations for each of these operating environments.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to display GIS information of a topology. According to one embodiment of the invention, GIS information and display is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hardwired circuitry may be used in place of or in combination with software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface is coupled to a virtual blackboard. Wireless links may also be implemented. In any such implementation, communication interface 118 sends and receives electrical, electromagnetic or optical signals which carry digital data streams representing various types of information.

Before discussing the specific implementation of the present invention, two basic concepts will be discussed first to facilitate the understanding of the invention.

The first concept is that of classifying topological information by geometrical objects and feature identifiers representing topological features to reconstruct each topological feature. Prior art GIS systems classify topological information by feature objects using geometrical primitives to reconstruct each topological feature. In a sense, the present invention has inverted the data structure as compared to prior art GIS systems. Prior art systems start from a feature identifier (object) containing geometrical primitives to reconstruct the topological feature whereas the present invention starts from the geometry (object) of the topological feature, containing an identifier of the feature as an attribute of the object. Thus, the prior art systems cannot draw a topological feature without reference to other topological features and considering adjacency, linkage, inclusion or proximity. The present invention can draw a topological feature without reference to another topological feature because the feature is independent of other features. This first concept permits the building of low cost databases.

Figure 5:
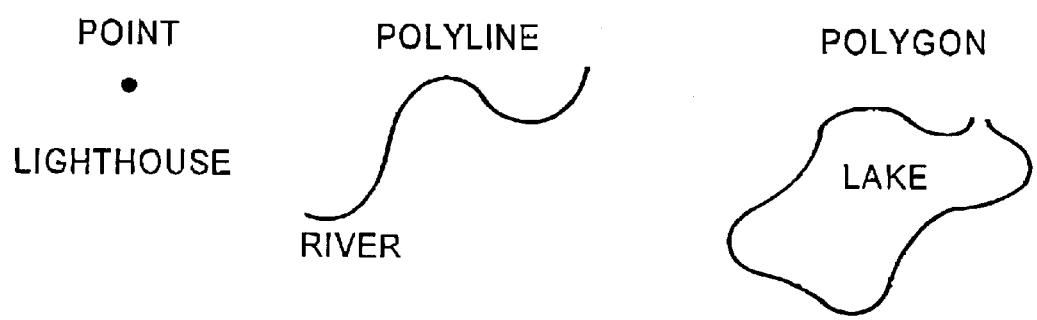
FIG. 5 is a diagram of the object classes used in the present invention.

In the present invention, topological features are represented by point objects, polyline objects and polygon objects. As depicted in FIG. 5, point features have only a location. A lighthouse is an example of a point feature and is depicted in FIG. 5 as a point object. A polyline object is a line feature from a map. The line feature has several line segments and/or points. A river is an example of a line feature and is depicted in FIG. 5 as a polyline object. A polygon object is a geographic feature recorded on a map as a sequence of locations or lines that taken together define an enclosed area having a positive area that represents the feature. Area is a two-dimensional feature enclosed by a line that forms a boundary. A lake is an example of an area which is depicted in FIG. 5 as a polygon object. The background of the map is represented by raster objects. Each raster object represents one screen display point or one pixel. These complete geometric objects are stored in an object-based data structure as described below. An attribute is a characteristic of a topological feature that includes a measurement or value for the feature. Examples of attributes include a feature identifier, an ordered list of coordinates, a visibility level, a line weight and a color. As will be explained in detail below, the complete geometric objects differ significantly from the prior art because the complete geometric objects are independent of other objects.

Geometrical objects are especially advantageous when used with the second concept. The second concept is that of using tiling and layering to divide a geographic space. Tiling is the dividing of a geographic space into tessellations or tiles, preferably rectangular in shape. Tiling can also be thought of as dividing a layer horizontally. Layering is the placing of tiles one over another. Layering can be thought of as dividing the geographic space vertically. The layers of tiles can also be thought of as a stack of transparent sheets of paper with the top level representing the largest and grossest detail. Each layer has the same overall dimensions and has the same outer boundary. The first level contains only a single tile. The next lower level contains four rectangular tiles (2×2) and has a little more detail and the next lower level contains sixteen rectangular tiles (4×4) and has still greater detail. Even lower levels have exponentially more tiles (e.g., 8×8 and 16×16) with each layer containing still greater detail.

The geometrical objects are associated with at least one tile. A tile is a self contained set of objects. As explained below, the combination of the two concepts provides, in part, the ability to use the GIS system of the present invention in mission critical applications.

These two concepts can best be understood with reference to FIGS. 6a–6f having graphical displays of the United States on six layers of tiles and FIGS. 7a–7f illustrating databases associated with each of the tiles of FIGS. 6a–6f. The description provided below is an overview of the basic concepts of the present invention. It should be understood that the specific implementation of the present invention differs from that described herein because it is believed that a completely detailed topology would obscure the present invention.

Figure 8:
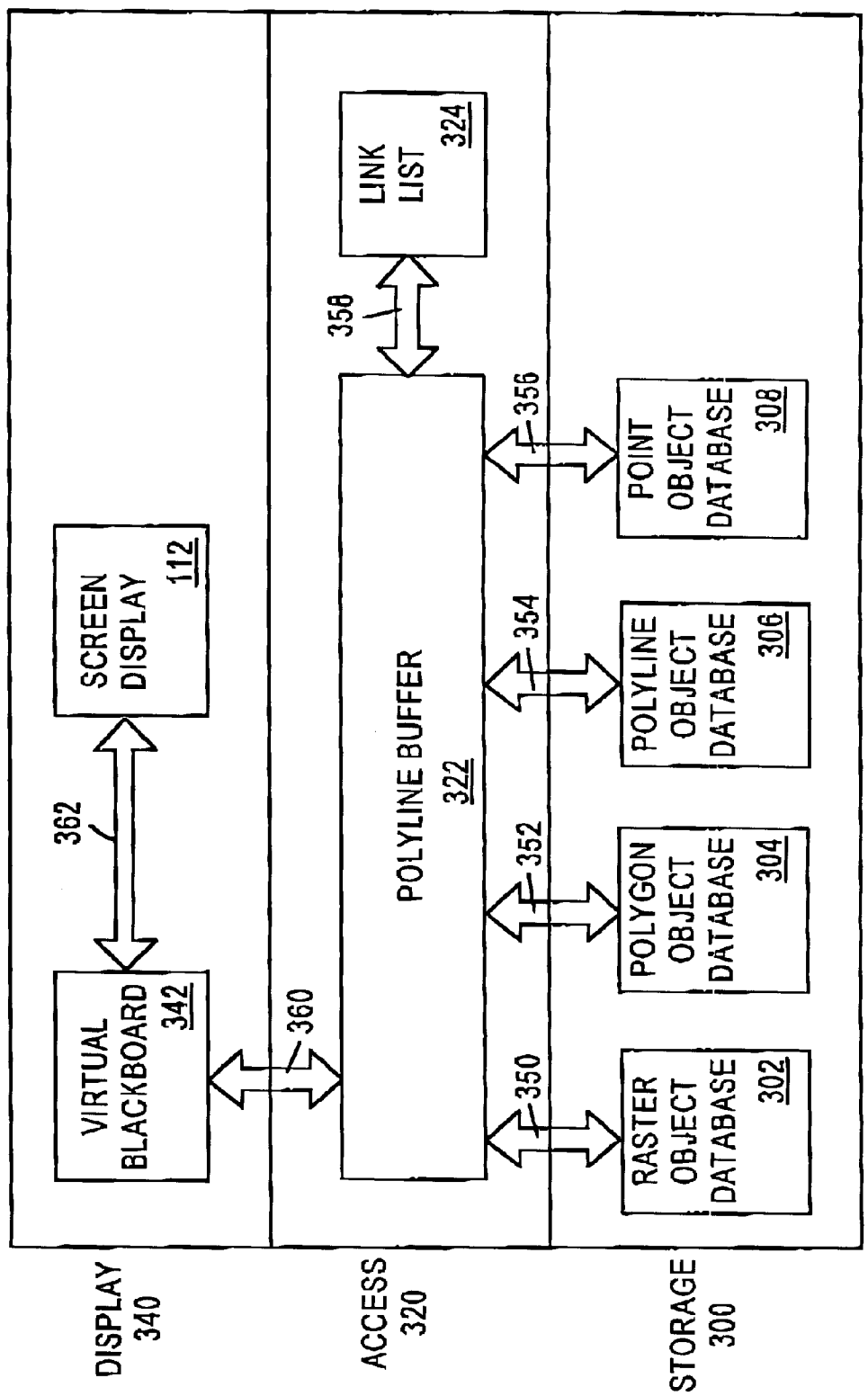
FIG. 8 is a schematical representation of the system architecture including display, access and storage layers of the GIS system.

There are a total of four relational databases; a first database for polygon objects (see 304 in FIG. 8), a second database for polyline objects (see 306 in FIG. 8), a third database for point objects (see 308 in FIG. 8) and a fourth database for raster objects (see 302 in FIG. 8). In FIGS. 7a–7f, small example databases are depicted which include the objects depicted in FIGS. 6a–6f. Each object has attributes which are associated with each object.

Figure 6A:
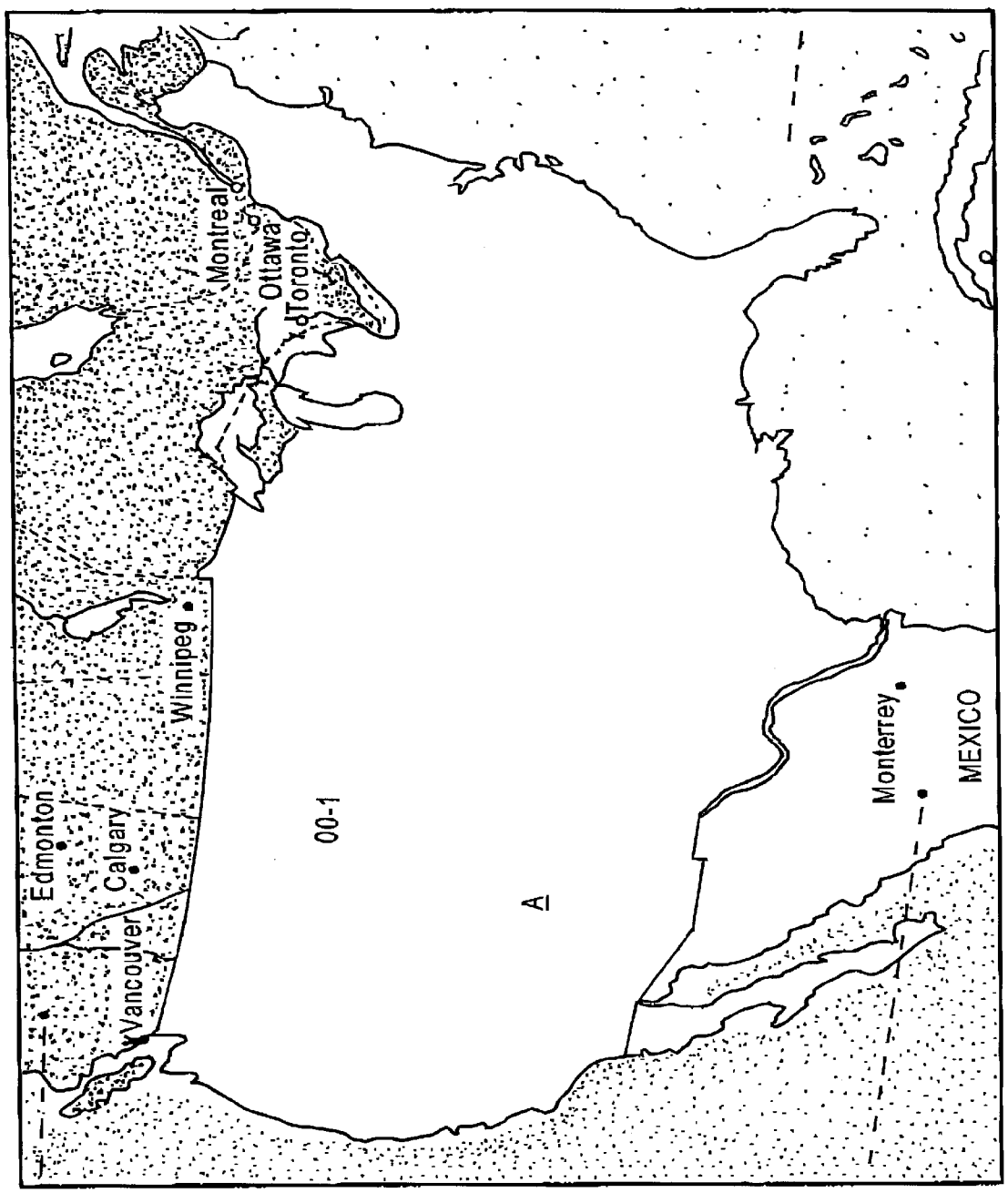
FIG. 6a is an illustration of a geographic region divided into layers and tiles with this Figure being at the top level (level 00), with the entire region being a single tile.

FIG. 6a depicts, for convenience, the boundary of the United States within a rectangular border. For simplicity, only the boundary of the United States will be described and the illustrated portions of Canada and Mexico should be ignored. The rectangular border represents the outer boundary of the geographic region for FIGS. 6a–6f. FIG. 6a depicts the top level 00 having only a single tile 00-1. Each tile has a self-contained set of objects associated with the tile. FIG. 7*a* depicts a file containing all of the objects depicted in FIG. 6*a*.

The boundary of the United States is a polygon object. Attributes are assigned to polygon object A, the most important of which is that the polygon object is in tile 00-1. Other attributes are an identifier A, a feature of the United States, an ordered list of coordinates, all of which are stored in the polygon object database 304 as a file depicted in FIG. 7*a*. Raster objects associated with tile 00-1 are stored in the raster object database 302 as a file as depicted in FIG. 7*a*. The bitmap includes x-y coordinates known to have an absolute location—a location in geographic space given with respect to a known origin and standard measurement system, such as a coordinate system coordinate pair latitude and longitude. Because there are no polyline objects or point objects depicted in tile 00-1 the files for polyline and point objects for tile 00-1 are empty. Thus, the polyline object database 306 and the point object database 308 do not have any polyline objects or point objects associated with tile 00-1. Polyline objects and point objects might occur in any given tile and there would be a visibility level associated with each object. Typically, raster objects are drawn first, then polygon objects, polyline objects and point objects. Raster objects associated with tile 00-1 are stored in the raster object database 302 as a file as depicted in FIG. 7*a*. Thus, if only tile 00-1 were loaded into a display, only the boundary of the United States would be displayed along with a raster background.

FIG. 6*b* depicts the next lower level 10 having four tiles (2×2) 10-1, 10-2, 10-3, 10-4. The tiles are divided into vertical columns and horizontal rows. As with tile 00-1, each of the four tiles on level 10 have four files associated therewith for a total of sixteen additional files within a respective database. For convenience, only objects associated with tile 10-1 will be described herein. Each of the states is a polygon object and is stored in a respective file associated with tile 10-1. As before, the polygon objects are given attributes. As depicted in FIG. 6*b*, the polygon objects are as follows: Washington state is polygon A, Oregon is polygon B, Idaho is polygon C, Montana is polygon D, North Dakota is polygon E, Minnesota is polygon F, California is polygon G, Nevada is polygon H, Utah is polygon I, Wyoming is polygon J, South Dakota is polygon K, Colorado is polygon L, Nebraska is polygon M, and Kansas is polygon N. Again, there are no polyline objects or point objects associated with tile 10-1. Raster objects associated with tile 10-1 are stored in the raster object database 302 as a file as depicted in FIG. 7*b*. Raster objects associated with tile 10-1 are stored in the raster object database 302 as a file as depicted in FIG. 7*b*.

It should be noted that objects G, H, I, L, and N extend into tile 10-3. Tile 10-3 will also include objects G, H, I, L and N meaning that these objects are replicated in the file associated with each tile. Thus, if only tile 10-1 were loaded into a display, only the boundary of each of the states within tile 10-1 would be displayed along with a raster background. The boundary of the United States is coincident with the boundaries of objects G, B, A, C, D E and F and so would appear because this boundary also happens to be the boundary of the individual states. If both layers 00 and 10 were drawn on a display, then the United States boundary would be displayed while the boundaries of the states underneath would be obscured.

Figure 6C:
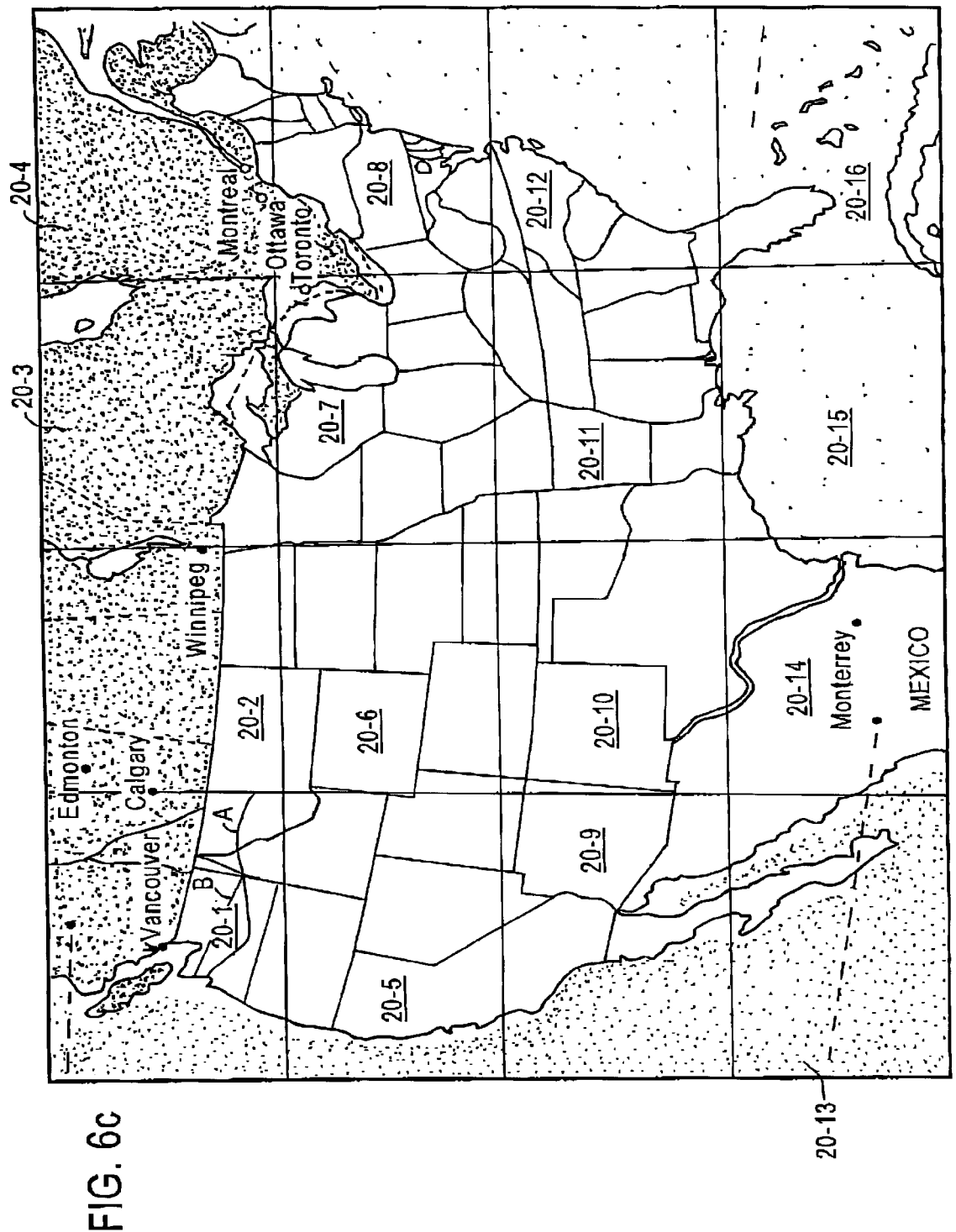
FIG. 6c is an illustration of the geographic region of FIG. 1 with this Figure being at a next lower level (level 20), with the entire region being divided into sixteen tiles (4×4)

FIG. 6*c* depicts the next lower level 20 having sixteen tiles (4×4), 20-1–20-16. As with tile 00-1, each of the sixteen tiles on level 20 has four files associated therewith for a total of sixty four additional files each within a respective database. For convenience, only objects associated with tile 20-1 will be described herein. Although the boundaries of the states are depicted in FIG. 6*c*, it should be understood that these objects would not appear if only level 20 were being displayed.

Only two polyline objects are depicted in tile 20-1, although it should be understood that many more objects would be displayed on a working embodiment of the invention. The first object is a polyline which represents Interstate 90 and is object A. The second object is a polyline which represent Route 2 and is object B. Other attributes include an identifier, an ordered list of coordinates, all of which are stored in the polyline object database as a file as depicted in FIG. 7*c*.

It should be understood that each polygon, polyline and point object may have the attribute of a relative location an example of which would be a street address.

Figure 6D:
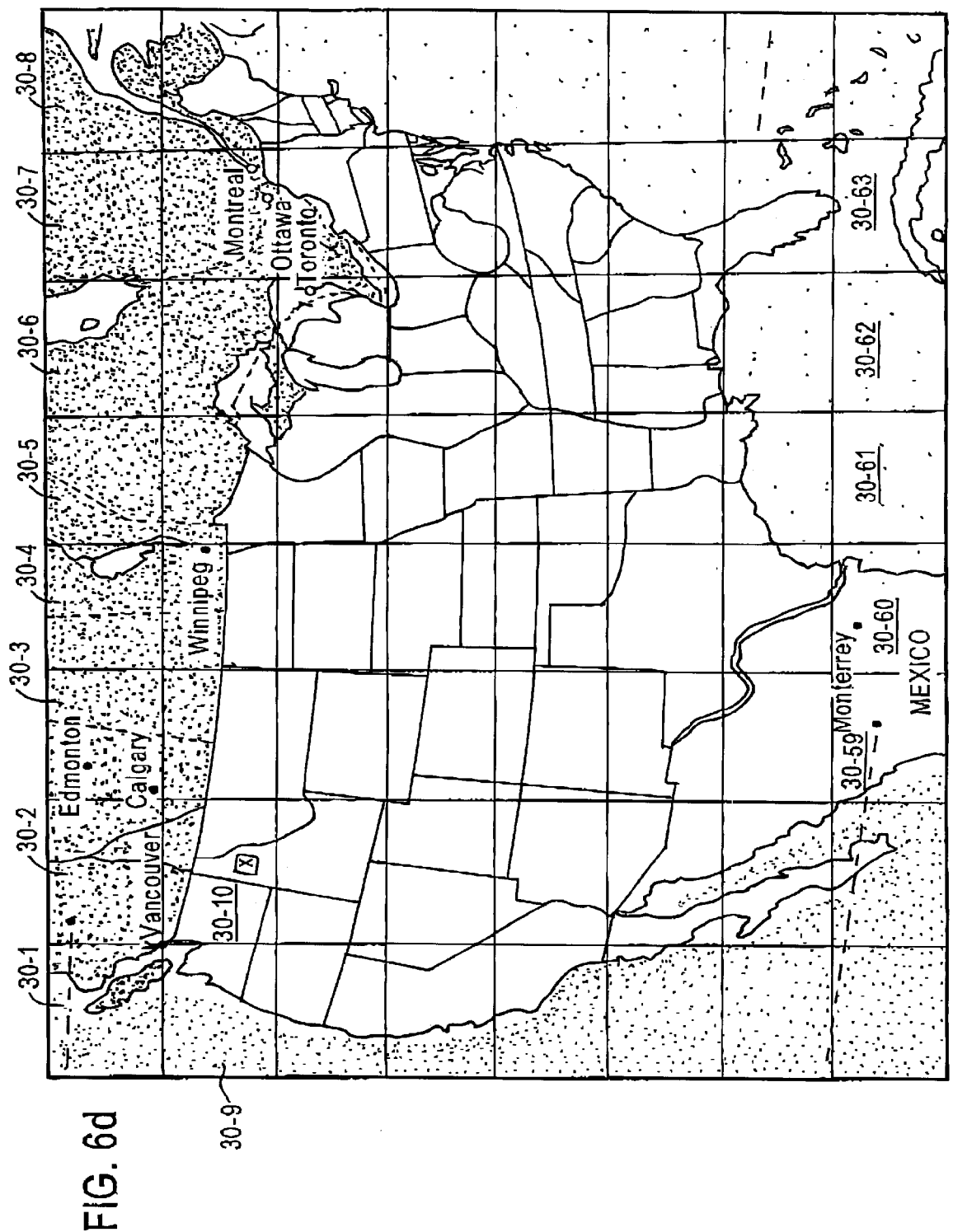
FIG. 6d is an illustration of the geographic region of FIG. 1 with this Figure being at a next lower level (level 30), with the entire region being divided into sixty four tiles (8×8)

FIG. 6*d* depicts the next lower level 30 having sixty-four tiles (8×8), 30-1–30-64. As with tile 00-1, each of the sixty-four tiles on level 30 has four files associated therewith for a total of two hundred fifty six additional files each within a respective database. For convenience, only objects associated with tile 30-1 will be described herein. Although the boundaries of the states are depicted in FIG. 6*d*, it should be understood that these objects would not appear if only level 30 were being displayed.

FIG. 6*e* depicts the next lower level 40 having two hundred fifty six tiles (16×16), 40-1–40-256. As with tile 00-1, each of the two hundred fifty six tiles on level 40 has four files associated therewith for a total of one thousand twenty four additional files each within a respective database. For convenience, only objects associated with tile 40-53 will be described herein. Although the boundaries of the states are depicted in FIG. 6*e*, it should be understood that these objects would not appear if only level 30 were being displayed.

FIG. 6*f* depicts the next lower level 50 having one thousand twenty-four tiles (32×32), 50-1–50-1024. As with tile 00-1, each of the one thousand twenty-four tiles on level 30 has four files associated therewith for a total of four thousand ninety six additional files each within a respective database. For convenience, this layer is not going to be described in detail. This layer could have street maps or other highly detailed information. It can be appreciated that the overlay of information from all six layers would provide a highly detailed map.

The invention would include at least five or six layers in order to achieve real time as discussed below. Two hundred and fifty six layers and two hundred fifty six levels per layer are envisioned for the invention. Although the boundaries of the states are depicted in FIG. 6*f*, it should be understood that these objects would not appear if only level 30 were being displayed.

It should be noted that the advantages of the present invention are best achieved when approximately the same amount of information is included in each tile as explained below. This may take into account the feature density. Thus, smaller tiles will typically contain much more detailed information than larger tiles. For the sake of brevity, the amount information included on layers 00–50 as described herein is not equal but unequal.

It should be also be understood that the list of attributes can be expanded depending on the application and the attributes described herein are for illustrative purposes only and is not meant to be a comprehensive list. For example, non geographical information can be included such as census information. Other attributes may be appropriate.

Advantageously, the data structure of the present invention does not require inheritance from any ancestor data structures. Inheritance is the process of receiving attributes from an ancestor. In the class paradigm, a class inherits attributes from a single class, or multiple classes. The process of inheritance is analogous to a child inheriting the mother's hair color and the father's nose. This is an important difference between the present invention and prior art geological information systems. As compared to the data structures depicted in FIGS. 1–3, any polygon object or polyline object can be drawn and displayed in the present invention without access to any other object. An instance is used to denote the creation of an object from a class. In other words, an object is an instance of a class. This is also called instantiation.

Figure 1:
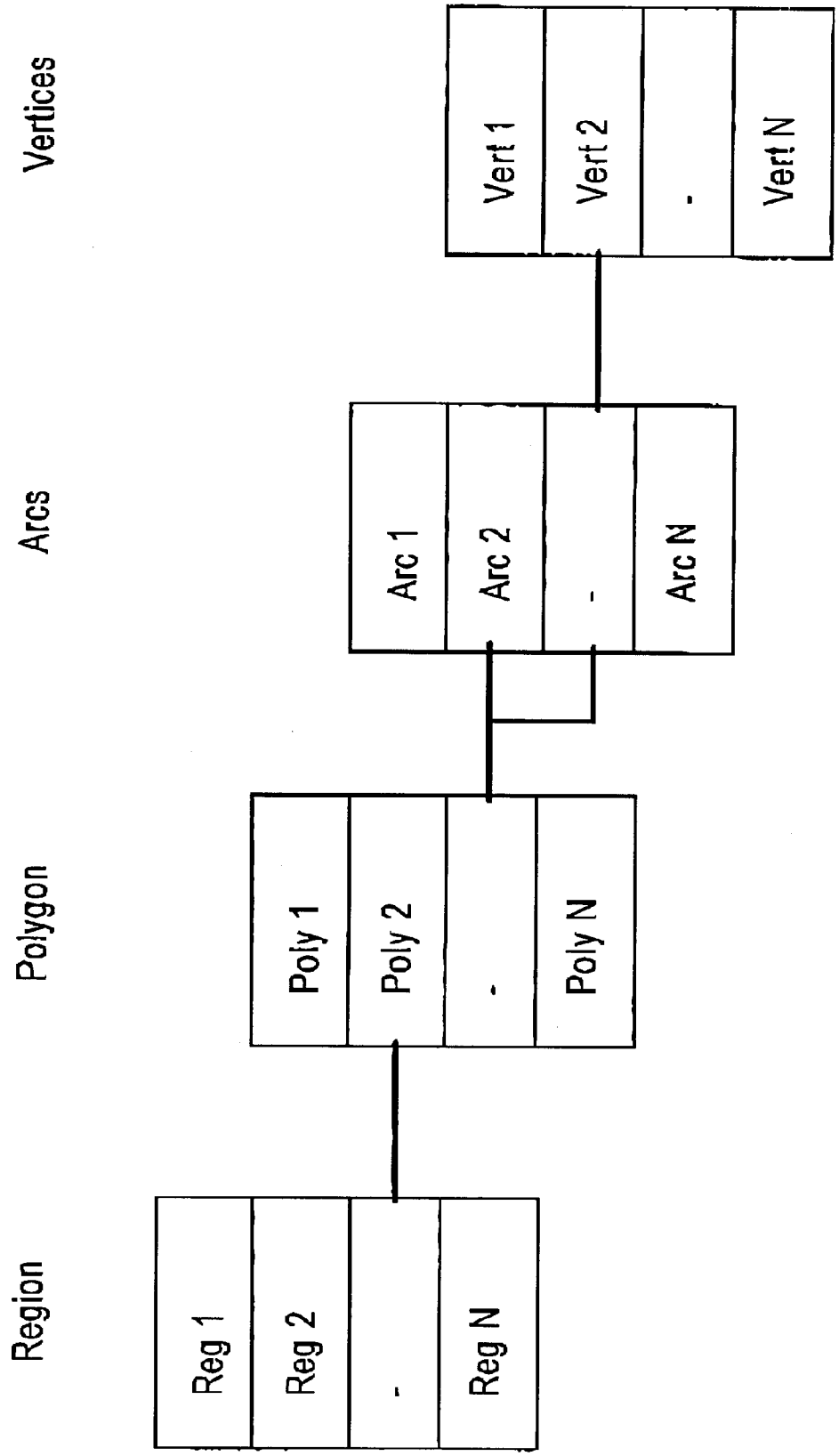
FIG. 1 is a diagram of a typical prior art topological data structure used in a GIS system.
Figures 2A, 2B, 2C, 2D:
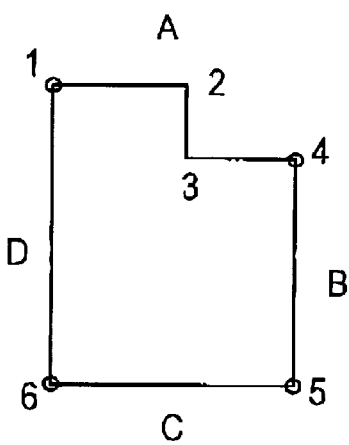
FIG. 2a is a prior art arc/node diagram of a polygon depicting the outline of the state of Utah.
FIG. 2b depicts a polygon file for the polygon of FIG. 2a and contains an entry for the area of the polygon, an entry for the attributes of the polygon and an entry listing the arcs defining the polygon.
FIG. 2c depicts an arcs file for the polygon of FIG. 2a and lists the vertices for each arc.
FIG. 2d depicts a vertices file for the polygon of FIG. 2a and lists the coordinates for each of the points.
Figures 3A, 3B:
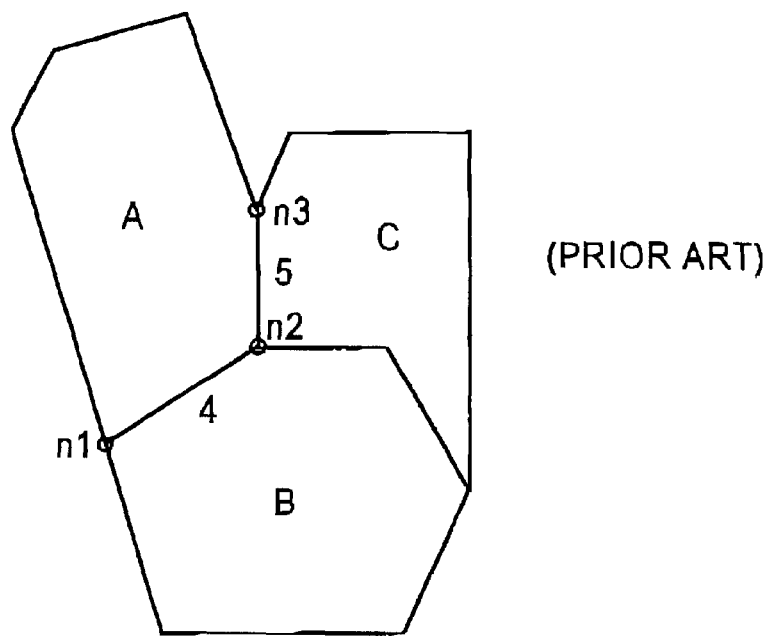

It is also important to understand the difference between the data structure of the present invention depicted in FIGS. 7a–7f as compared to the prior art database structures depicted in FIGS. 1–3. In a sense, the present invention database has an inverse relationship between classes and features as compared to the prior art. The present invention groups features according to the class that the feature belongs in. For example, all topological features that are polygons are stored in the polygon database. The feature (e.g., state or county) then becomes an attribute of that polygon object.

By contrast, the prior art database groups topological features according to regions (street or river) and then attributes geometrical properties to that region. This subtle but important difference provides major advantages for the present invention in terms of displaying topological information in real time, in terms of reducing the cost of constructing databases, and in terms of providing faster responses to queries made of the GIS system as explained below.

Each object is geometrically complete in that it does not rely on other objects or the relationships between objects to reconstruct a topological region or topological feature.

The architecture of the GIS system according to the present invention is depicted schematically in FIG. 6a. The GIS system has a storage area 300, an access area 320, and a display area 340. Within the storage area 300 is the raster object data base 302, the polygon object data base 304, the polyline object data base 306, and the point data base 308. Databases 302, 304, 306, 308 are preferably on a computer readable medium such as storage device 110. Databases 302, 304, 306, 308 can then be used to store information on different geographic regions and updated as necessary.

The access area 320 includes a polyline buffer 322 and a link list 324. Both polyline buffer 322 and link list 324 can be located in main memory 106. The display area 340 includes a virtual blackboard 342 and the screen display 112. Virtual blackboard 342 can reside in main memory 106. The raster object database 302 is connected to the polyline buffer 322 via a bus 350. The polygon object database 304 is connected to the buffer 322 via a bus 352. Polyline object database 306 is connected to the buffer 322 via a bus 354. The point database 308 is connected to the buffer 322 via a bus 356. The buffer 322 is connected to the link list 324 via bus 358. The buffer 322 is connected to virtual blackboard 342 via a bus 360. The virtual blackboard 342 is connected to screen display 112 via a bus 362.

The advantages of the present invention are achieved when the complete geometrical objects are used in combination with tiling, layering and the virtual blackboard. With the exception of layer 00, four tiles from a layer are always loaded into the virtual blackboard 344 and the files associated with these tiles are loaded into the polyline buffer 322. Only one of the four tiles loaded into the virtual blackboard 344 is displayed on the screen display 112.

One such advantage is the ability to enlarge an image or zoom in real time. In the present invention, an example of zooming is to go from an overview at level 00 to detail at level 10 and then to further detail at level 20 and so on. This can best be explained by an example with reference to the table below:

TABLE 1

| Level | Figure | Tiles | |
| --- | --- | --- | --- |
| 00 | 6a | 00-1 | |
| 10 | 6b | 10-1 | 10-2 |
| | | 10-3 | 10-4 |
| 20 | 6c | 20-1 | 20-2 |
| 20 (continued) | 6c | 20-5 | 20-6 |
| 30 | 6d | 30-2 | 30-3 |
| | | 30-10 | 30-11 |
| 40 | 6e | 40-36 | 40-37 |
| | | 40-53 | 40-54 |
| 50 | 6f | 50-170 | 50-171 |
| | | 50-203 | 50-204 |

The tiles listed above for each level 10–50 would be loaded into the virtual blackboard with only four tiles loaded at any given time. Each of the four tiles would have one adjacent horizontal tile and one adjacent vertical tile and one tile diagonally positioned therefrom.

For example, the sequence of zooming from level 00 to tile 50-203 could be as follows. At level 00, tile 00-1 is loaded into the virtual blackboard 342 and is displayed on the screen display 112. At level 10, tiles 10-1, 10-2, 10-3, 10-4 can be loaded into the virtual blackboard 342 but only tile 10-1 would be displayed on the screen display 112 plus a portion of tile 00-1. At level 20, tiles 20-1, 20-2, 20-5, 20-6 can be loaded into the virtual blackboard 342 but only tile 20-1 would be displayed on the screen display 112 plus portions of tile 00-1 and tile 10-1. At level 30, tiles 30-2, 30-3, 30-10, 30-11 can be loaded into the virtual blackboard 342 but only tile 30-10 would be displayed on the screen display 112 plus portions of tile 00-1, tile 10-1 and tile 20-1. At level 40, tiles 40-36, 40-37, 40-53, 40-54 can be loaded into the virtual blackboard 342 but only tile 40-53 would be displayed on the screen display 112 plus portions of tiles 00-1, tile 10-1, 20-1, and 30-10. At level 50, tiles 50-170, 50-171, 50-203, 50-204 can be loaded into the virtual blackboard but only tile 50-203 would be displayed on the screen display 112, plus portion of tiles 00-1, tile 10-1, 20-1, 30-10 and 40-53.

In prior art systems the task of zooming becomes geometrically greater because the amount of computational effort becomes exponentially greater as more detail is drawn. As a user attempts to zoom, the system becomes slower and slower as greater detail is displayed.

The present invention advantageously uses 1) complete geometrical objects; 2) tiling and 3) layering. This combination makes the GIS system of the present invention faster in zooming because obtaining greater detail is an inverse geometrical effort. As a user zooms to tiles having greater detail, the amount of computational effort becomes smaller because the amount of information in a small tile is relatively small. Thus, the present invention provides the ability to update the screen display faster and faster as the area being drawn becomes smaller and smaller because less information is associated with each tile and because each tile has a complete set of geometrical objects associated with the tile.

Another advantage of the present invention is the ability to scroll in real time from one tile on one layer to another tile on the same layer. Using the geometrical objects, and layering and tiling previously described a user can scroll from one tile loaded in the virtual blackboard to another tile on the same layer already loaded in the virtual blackboard. The ability to scroll in real time is due to the replication of objects in adjacent tiles. This replication means that the object is already drawn into the virtual blackboard 342 and does not have to be reconstructed as in prior art systems. To scroll to a tile not already loaded in the virtual blackboard, it is necessary to predict which adjacent tile needs to be loaded into the virtual blackboard. This can be accomplished using a predictive drop and load algorithm described in another patent application previously incorporated by reference.

Figure 9:
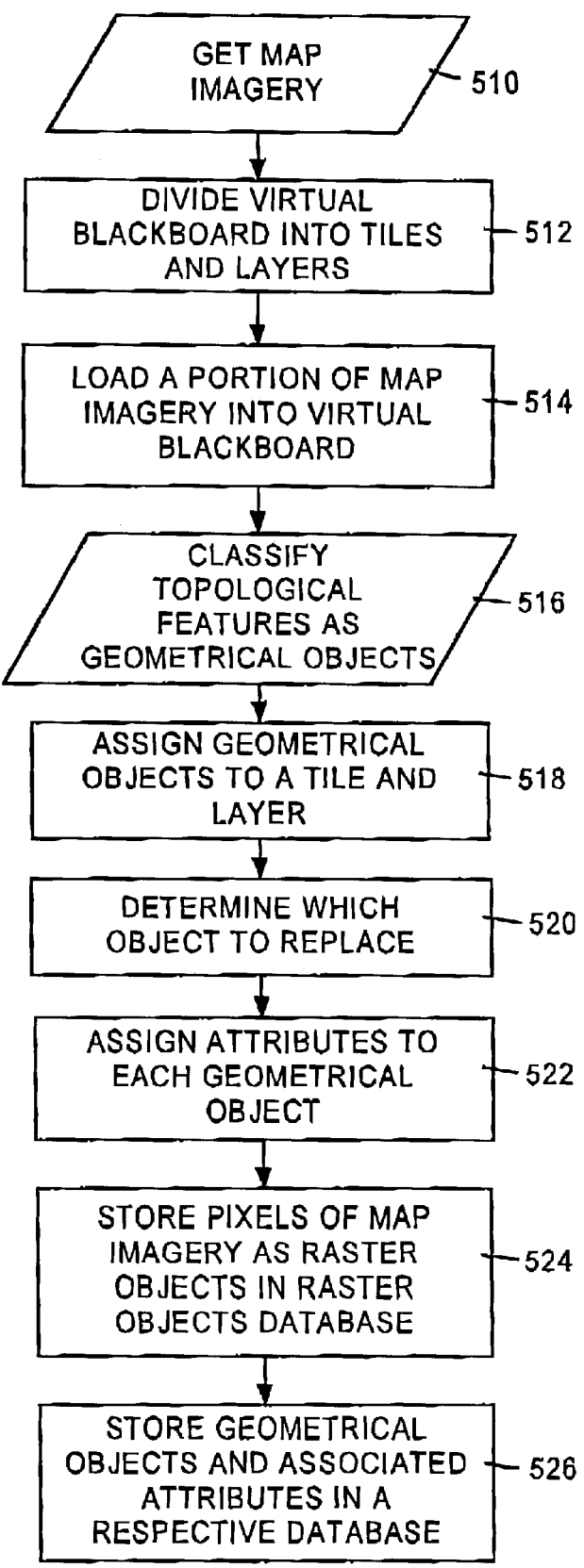
FIG. 9 is a flow chart illustrating the steps of decomposing a map into objects and assigning attributes to each of the objects.

Having discussed the conceptual building blocks of the present invention and the system architecture, the method of the present invention can be explained first with reference to FIG. 9. The flowchart of FIG. 9 illustrates the steps of decomposing a map into geometric features and storing these features in object databases.

At step 510, data for the geological information system of the present invention is first obtained from real word information such as surveyor's information, hygrographers information, and from satellite imagery. Existing map data can be obtained from sources such as the U.S. Geological Survey for the United States, from the National Oceanic and Atmospheric Administration for marine and aeronautical navigation, from orthophotos, and from satellite images, among others. It is important that the information obtained be real world information rather than information from maps because features on a map are not typically in the correct scale.

At step 512 a portion of this map imagery is loaded into the virtual blackboard 342. At step 514, the virtual blackboard 342 is divided into tiles and layers. For example, referring back to FIGS. 6a–6f, layer 00 has one tile, layer 10 has four tiles, layer 20 has sixteen tiles and so forth. At step 516, topological features of the map imagery are then either manually or semi-automatically classified as either point objects, polyline objects or polygon objects. For example, a lighthouse would be classified as a point object, a river would be classified as a polyline object, and a state would be classified as a polygon object. The semi-automatic method uses a digitizing tablet. At step 518, each classified object would be assigned to a particular tile. By assigning the object to a particular tile, this tile also has a visibility level associated with that tile.

As explained previously, it may necessary to replicate objects because the object is in two or more tiles. The objects that need to be replicated are replicated and stored with each tile in which the object might appear. At step 522, attributes are assigned to the geometrical object including for example, an ordered list of coordinates and color. At step 524, raster objects associated with each tile are stored in the raster objects database 302. At step 526, the geometrical objects and assigned attributes are stored in a respective database 304, 306, 308.

Figure 10:
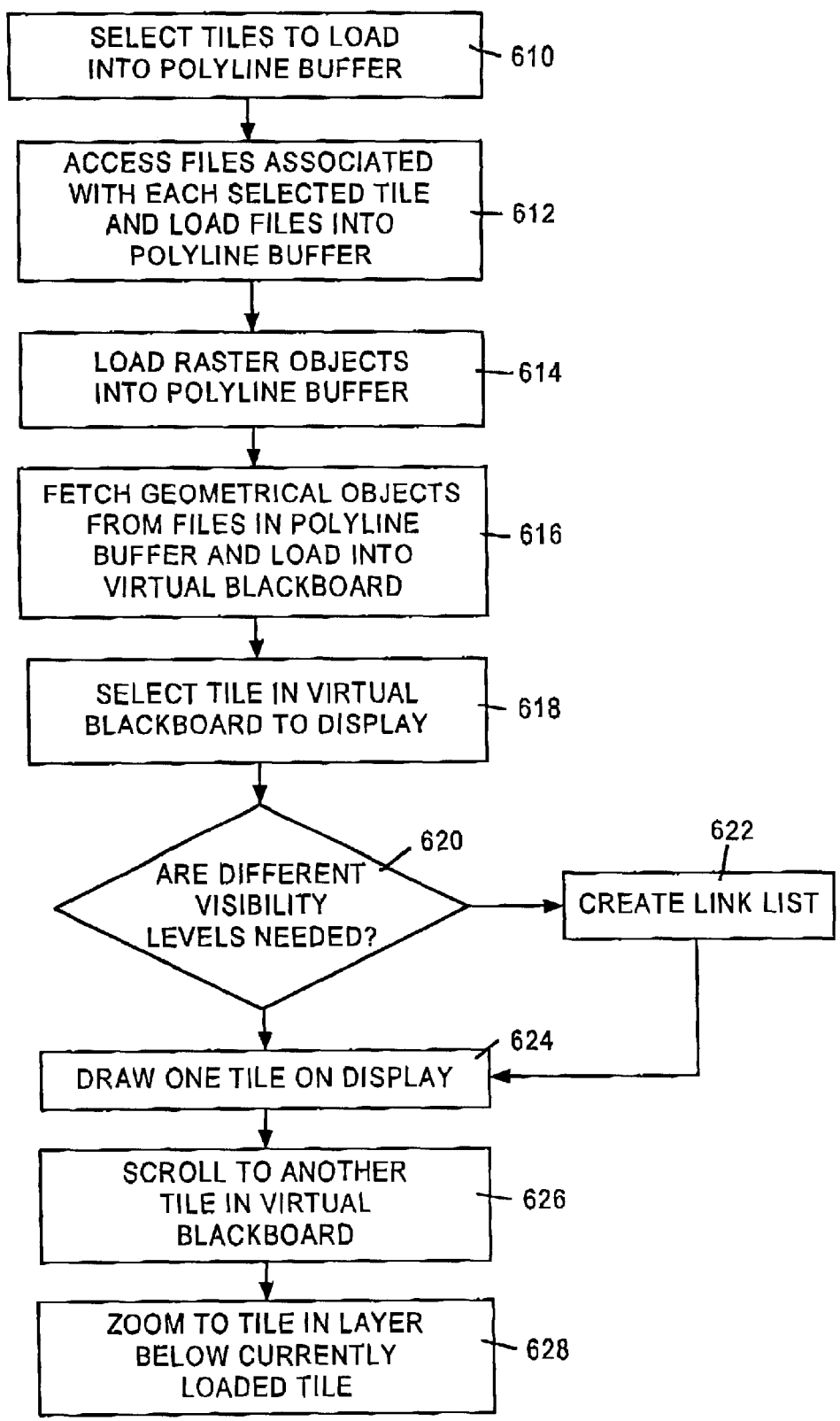
FIG. 10 is a flow chart illustrating the steps of displaying a map on the display and loading a topological region into the virtual blackboard.

The loading of tiles into the virtual blackboard and display of one tile is depicted by the steps in FIG. 10. At step 610, the user selects tiles to load into the polyline buffer 322. As mentioned previously, the four tiles are contiguous. As step 612, files associated with each the four selected tiles are accessed from each of the data bases 302, 304, 306 and 308 and loaded into the polyline buffer 322. For example, the four tiles being displayed may be based upon the current location of the GIS system based upon a signal received from a GPS satellite.

At step 614, the raster objects associated with the four selected tiles are loaded into the polyline buffer. At step 616, the geometrical objects associated with the four selected tiles are fetched from the polyline buffer 322. Because only tile can be displayed on display 342, at step 618, the user selects which tile to display. At step 620, it needs to be determined if different visibility levels are needed. If so, at step 622, a link list may need to be created. For example, referring back to FIG. 7b, if tile 10-1 were being displayed and the user wished to display lighthouses (assuming lighthouses are on layer 40) then a link list would need to be created to display lighthouses on tile 10-1.

Generally, at step 616 for a particular tile, polygon objects are loaded first, then polyline objects and finally point objects. However, there is a rule set that is built into each of the databases for visibility. The order in which each of the objects are drawn are based upon the visibility. In other words, there are a series of levels. The object that needs to be obscured most is drawn at the lowest level so it is drawn first. This is typically the raster object level that is drawn first. The object that requires greatest visibility is obscured least and is the last to be displayed. The current system is capable of 256 visibility levels for a tile. For example, a bridge going over a river, both of which will be indicated with polyline objects, the bridge would be shown at a higher visibility level if the bridge goes over the river.

In either event at step 624, one tile is drawn from the virtual blackboard 342 to the screen display 112. If the user wishes to scroll at step 626, the user has access to the entire virtual blackboard 342 which contains four tiles while the screen display 112 displays one of the four tiles. The user has instant access to anything that is in the virtual blackboard. The screen display 112 can be updated faster than real time for scrolling from the tile being displayed on the screen display 112 to any of the three other tiles being stored within the virtual blackboard 342. Advantageously, because the polygon objects, polyline objects and point objects have been loaded into the virtual blackboard 342, the objects do not have to be derived every time that the objects are accessed from the virtual blackboard 342 as in prior art systems which have to reconstruct the entire display from primitives.

The GIS system of the present invention also permits scrolling in less than real time from the displayed topological region to other regions of the virtual blackboard. The prior art systems also lack a virtual blackboard so that the display of topological regions not currently being displayed on the screen is very slow.

Advantageously, the present invention also has the capability to zoom from a tile in one layer to a tile in a layer below. At step 628, a user can zoom as previously described.

The present invention also is an information system meaning that the system is designed to deliver an answer to a query from a database. For example, the GIS system can be queried to display all lighthouses or to display a certain topological space. The system also provides database management allowing data entry, data editing retrieval functions include the ability to select certain attributes and records based on their values. Objects are highlighted which is a way of indicating to the user that a feature is the successful result of a query.

Figure 11:
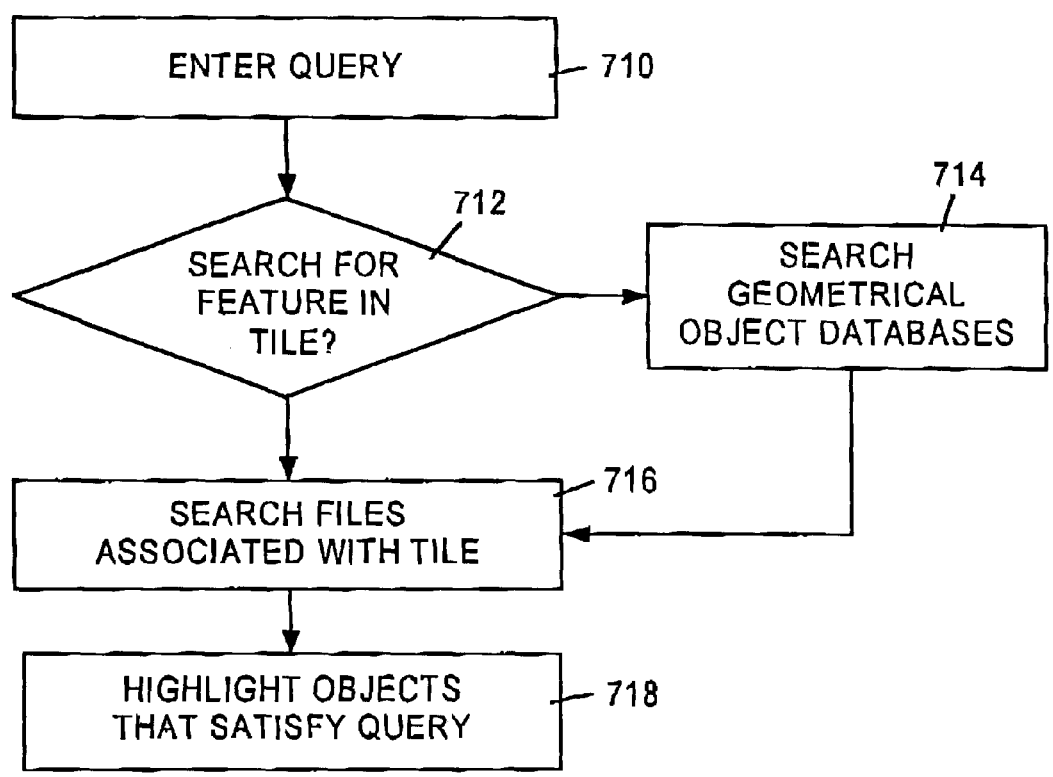
FIG. 11 is a flow chart illustrating the steps of performing a query.

The database structure of the present invention provides several advantages in conducting queries relative to prior art systems. For example, at step 710 in FIG. 11, the user can enter a query. At step 712, it is determined whether to search only the file associated with that tile, or only the files in the polyline buffer, or all of the geometrical object databases stored in memory. If the search is conducted only for one tile, the search would be very fast. Similarly, if the search is conducted only for tiles loaded in the polyline buffer, because the search is being conducted in virtual memory. Queries can also be conducted only for polygons, polylines or points or for a specific feature such as a lighthouse. A match for a lighthouse query would be highlighted and displayed in real time at step 718. Similarly, a match for an address query would be displayed in real time.

It should now be apparent that a GIS system has been described which is capable of displaying a topological region in real time through the use of geometrical objects. It should also be apparent that the GIS system can scroll in real time through the use of a virtual blackboard.

Advantageously, the object-based database can also be easily and inexpensively updated by adding and/or removing geometrical objects. This is because the stored geometrical objects are not based on other primitives. The prior art systems require extensive modification of existing records in the database whereas the present invention only requires the addition or deletion of records.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for displaying a topology having topological features on a display, the method comprising the steps of:

dividing the topological region into tessellations;

accessing an object-based database comprising geometrical objects representing the topological features, each geometrical object associated with a particular tessellation, the geometrical objects being one of a polygon object, a polyline object and a point object representing the topological features, each of the geometrical objects including a geometry attribute defining the complete representation of a topological feature;

selecting a tessellation to display;

fetching the geometrical objects associated with the tessellation to be displayed;

drawing the fetched geometrical objects for the selected tessellation on the display.

2. The method of claim 1, wherein said fetching step includes the step of loading the fetched geometrical objects into a virtual blackboard.

3. The method of claim 2, further comprising the steps of: fetching geometrical objects associated with three additional tessellations and loading the three tessellations into the virtual blackboard.

4. The method of claim 3, further comprising the steps of: scrolling from the tessellation drawn on the display to a tessellation loaded into the virtual blackboard; drawing one of the three tessellations on the display.

5. The method of claim 1, wherein said tessellations are rectangular.

6. The method of claim 3, wherein the four tessellations are adjacent one another.

7. The method of claim 6, wherein said tessellations are rectangular and form rows and columns, two of said four tessellations being in one row and two of said tessellations being in one column.

8. The method of claim 1, wherein said drawing step occurs in real time.

9. The method of claim 1, further comprising the step of replicating geometrical objects which are located in two or more tiles, and associating each of the replicated objects with a particular tile.

10. A method for displaying a topology having topological features on a display, the method comprising the steps of:

dividing the topological region into tiles;

layering tiles on different layers with a top layer having a single tile and lower layers of tiles have succeedingly greater numbers of tiles;

accessing an object-based database comprising geometrical objects representing the topological features, each geometrical object associated with a particular tile, the geometrical objects being one of a polygon object, a polyline object and a point object representing the topological features, each of the geometrical objects including a geometry attribute defining the complete representation of a topological feature;

selecting four tiles;

fetching the geometrical objects associated with the four tiles; and drawing the fetched geometrical objects of one tile on the display.

11. The method of claim 10, wherein said fetching step includes the step of loading the fetched geometrical objects into a virtual blackboard.

12. The method of claim 11, further comprising the steps of:

scrolling from the one tile being displayed to a tile loaded into the virtual memory; and drawing the scrolled tile on the display.

13. The method of claim 10, wherein said tiles are rectangular.

14. The method of claim 13, wherein said tiles are rectangular and form rows and columns, two of said four tiles being in one row and two of said tiles being in one column.

15. The method of claim 10, wherein a second layer has four tiles and a third layer has sixteen tiles.

16. The method of claim 10, wherein said four tiles are on one layer.

17. The method of claim 10, wherein the drawing step occurs in real time.

18. The method of claim 10, further comprising the step of replicating geometrical objects which are located in two or more tiles, and associating each of the replicated objects with a particular tile.

19. The method of claim 10, further comprising the step of zooming from a tile on one layer to a tile on a layer below including:

selecting four tiles on the layer below;

fetching the geometrical objects associated with the four tiles; and drawing the fetched geometrical objects of one tile on the display.

20. A method of building an object-based database of a topology having topological features, the topological region being divided into tessellations on different layers, comprising the steps of:

identifying the topological features as geometrical objects, the geometrical objects being one of a polygon object, a polyline object and a point object, the geometrical objects each having a feature identifier attribute and being associated with one or more tessellations on a layer, each of the geometrical objects including a geometry attribute defining the complete representation of a topological feature;

storing the polygon objects in a polygon object database;

storing the polyline objects in a polyline object database; and storing the point objects in a point object database.

21. The method of claim 20, wherein said identifying step includes the steps of:

loading the topology into a virtual blackboard;

assigning attributes to each of geometrical objects; and storing the attributes assigned to the geometrical objects in a respective database.

22. The method of claim 21, further including the step of storing background information of the topology as raster objects in a raster object database.

23. The method of claim 20, wherein said identifying step includes the step of assigning for each polygon object the attributes of an identifier, a feature identifier, an ordered list of coordinates, a visibility level and a color.

24. The method of claim 20, wherein said identifying step includes the step of assigning for each polyline object, the attributes of an identifier, a feature identifier, an ordered list of coordinates, a visibility level and a color.

25. The method of claim 20, wherein said identifying step includes the step of assigning for each point object the attributes of an identifier, a feature identifier, an x-y coordinate, a visibility level and a color.

26. The method of claim 20, wherein the topology includes information obtained from real world information.

27. An article, comprising:

at least one sequence of machine executable instructions;

a medium bearing the executable instructions in machine readable form, wherein execution of the instructions by one or more processors causes the one or more processors to:

access an object-based database comprising geometrical objects representing topological features of a topological region, the topological region being divided into tessellations on different layers, the geometric features being associated with one or more tessellations on a layer, the geometrical objects being one of a polygon object, a polyline object and a point object, each of the geometrical objects including a geometry attribute defining the complete representation of a topological feature;

fetch the geometrical objects associated with a plurality of tessellations one of which is to be displayed;

draw the fetched geometrical objects associated with the one tessellation on a display.

28. An article as in claim 27, wherein the medium comprises a storage medium.

29. An article as in claim 27, wherein the medium comprises a carrier wave.

30. An article as in claim 27, wherein the medium comprises a communications link carrying a signal containing the executable instructions.

31. An article as in claim 27, wherein said tessellations are rectangular.

32. An article as in claim 27, wherein said plurality of tiles are on one layer.

33. An article as in claim 31, wherein said tessellations are tiles, a first layer having one tile, a second layer having four tiles and a third layer having sixteen tiles.

34. A computer-readable medium having a data structure stored thereon for access by a GIS system, the GIS system displaying a topological region having topological features on a display, the topological region being divided into tessellations on different layers, the topological features being classified as geometrical objects having feature identifiers, the geometrical objects being one of a polygon object, a polyline object and a point object, the data structure comprising:

a polygon object database having polygon objects each associated with a topological region, each polygon object having at least a feature identifier attribute and an ordered list of coordinates attribute and being associated with one or more tessellations on a layer;

a polyline object database having polyline objects each associated with a topological region, each polyline object having at least a feature identifier attribute and an ordered list or coordinates attribute and being associated with one or more tessellations on a layer; and a point object database having point objects each associated with a topological region, each point object having at least a feature identifier attribute and an x-y coordinate attribute and being associated with one or more tessellations on a layer;

wherein each of the geometrical objects include a geometry attribute defining the complete representation of a topological feature.

* * * * *